2,409,922

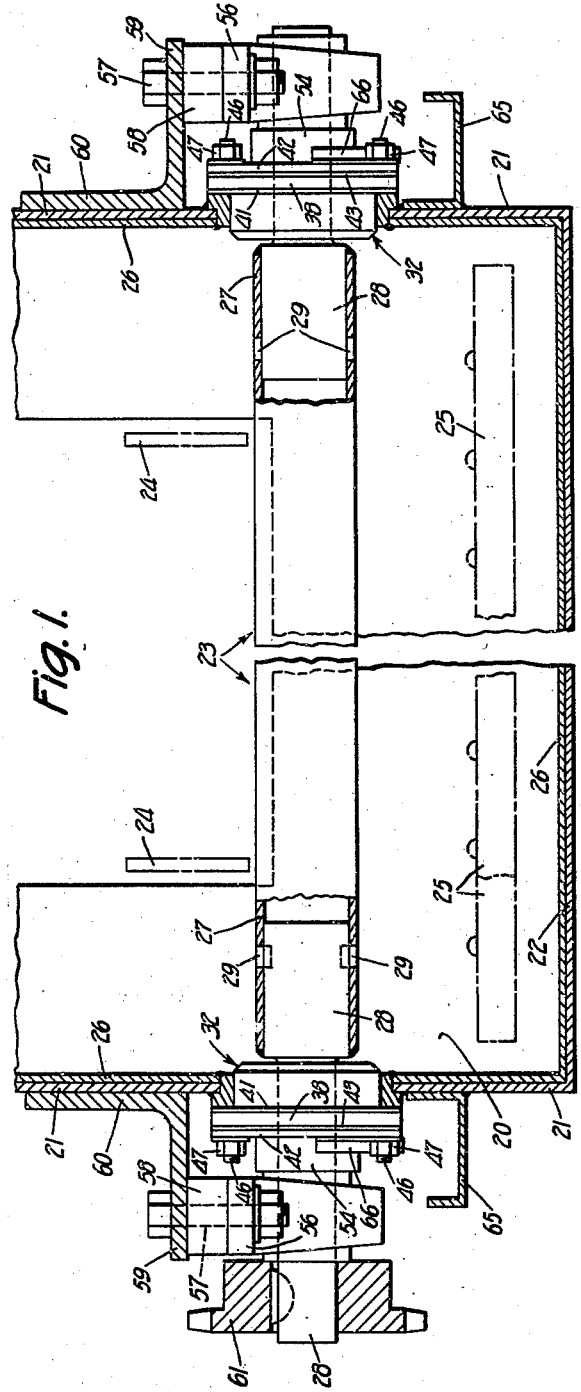
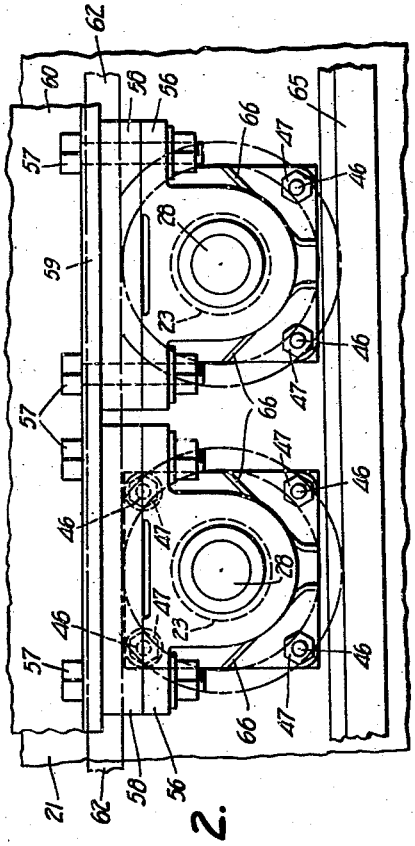
Fig. 1.
Fig. 2.
INVENTOR.
Erich R. Zademach and
William W. Clarke
BY Moses + Nolte
ATTORNEYS Oct. 22, 1946.  E. R. ZADEMACH ET AL  2,409,922
SHAFT BEARING SEAL
Filed Aug. 18, 1942  2 Sheets-Sheet 2
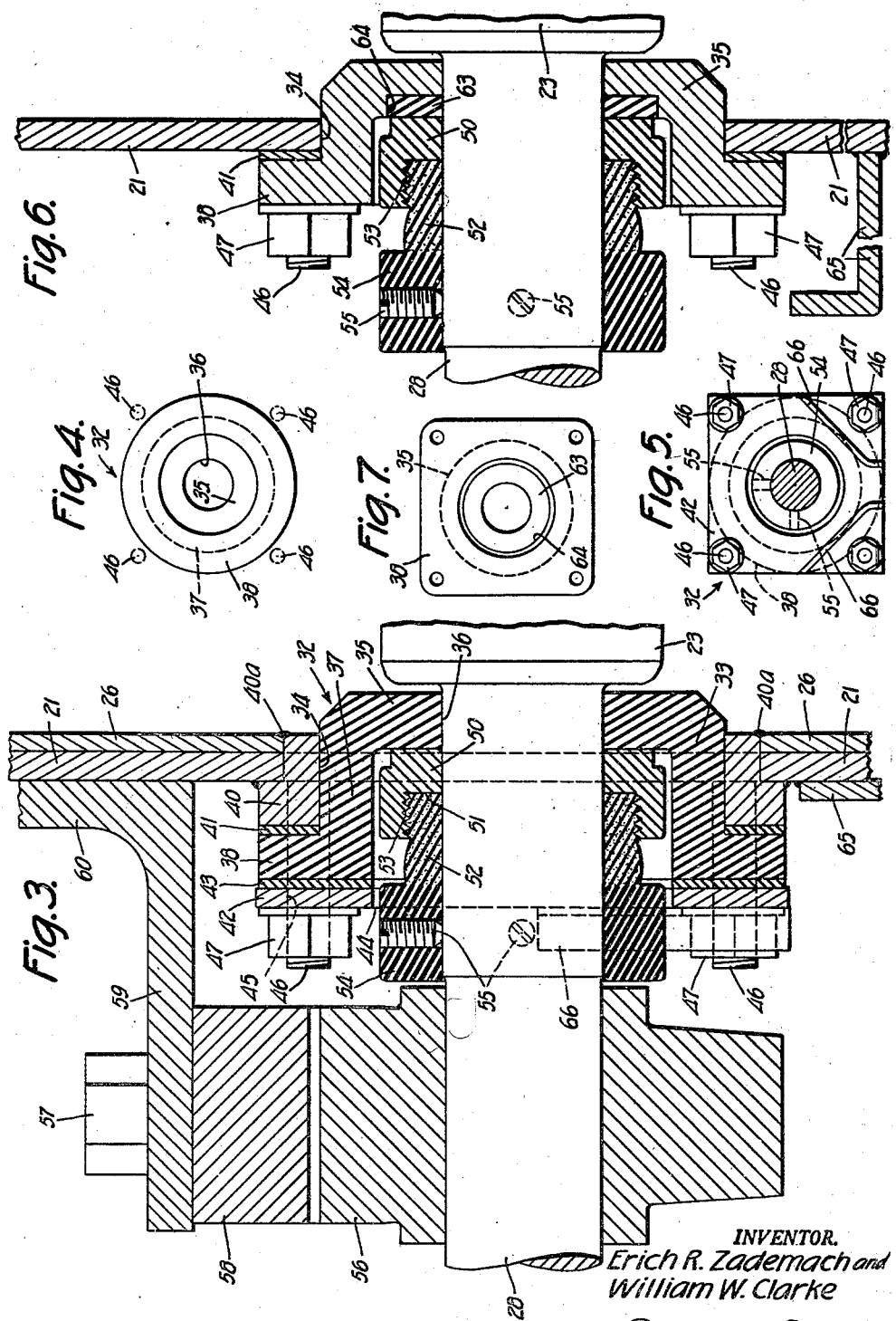
INVENTOR.
Erich R. Zademach and
William W. Clarke
BY 
ATTORNEYS Patented Oct. 22, 1946

UNITED STATES PATENT OFFICE 2,409,922

SHAFT BEARING SEAL

Erich R. Zademach, Elizabeth, and William W. Clarke, Summit, N. J., assignors to Metalwash Machinery Company, Newark, N. J., a copartnership Application August 18, 1942, Serial No. 455,179

7 Claims. (Cl. 286—11)

This invention relates to improvements in shaft bearing seals and is especially directed to a bearing seal construction adapted to prevent leakage of a fluid along a shaft at the point where the shaft passes through a wall. It is particularly suitable for preventing leakage of corrosive liquids from liquid treatment apparatus provided with shaft-driven devices located in a treating compartment, such as machines for subjecting metal articles on a shaft-driven traveling conveyor located in the compartment to treatment with sprays of pickling liquid or of other acid or alkaline liquids.

A feature of the invention is the provision of a shaft sealing unit that is readily assembled from simple parts and is adapted for mounting on the wall through which the shaft passes. Another feature is the novel arrangement of the parts to provide an effective radial sealing face between rotating and stationary members. The invention also includes an improved construction for holding a sealing member in place under pressure.

Other objects and advantages will appear from the following description considered in connection with the accompanying drawings in which Fig. 1 is a side elevation of a conveyor roller, partly in section, provided with sealed bearings at each end and mounted in a spray treatment tank shown diagrammatically in vertical section on the line of the roller;

Fig. 2 is a fragmentary end elevation of the bearing and seal construction on two adjacent rollers;

Fig. 3 is an enlarged central vertical sectional view through the sealing end bearing construction applied to a lead lined tank;

Fig. 4 is a face view of a seal unit body;

Fig. 5 is an elevation of the inner face of the sealing unit assembly;

Fig. 6 is a view similar to Fig. 3 showing a modified form of sealing unit applied to a plain wall; and Fig. 7 is a face view of the modified seal unit body shown in Fig. 6.

The invention is illustrated in its application to a metal pickling machine in which metal articles traveling through a compartment on a conveyor composed of a series of driven rollers are subjected to sprays of acid pickling liquid or other corrosive liquid. The apparatus as diagrammatically indicated in Fig. 1 includes a treating compartment 20 having side walls 21 and bottom wall 22. A series of aligned conveyor rollers 23 extend across compartment 20 and are suitably driven to convey articles thereon between guides 24 through sprays from a plurality of spray pipes 25 suitably distributed along the conveyor path above and below the conveyor. The compartment 20 is provided with a lead lining 26 extending continuously over the inner faces of walls 21 and 22, permitting the latter to be formed from sheet steel or other ordinary construction material which is not resistant to corrosive action.

Each conveyor roller 23 is provided with a shaft at each end extending through opposite side walls 21 and supported by a suitable bearing. In the illustrated arrangement stainless steel tubes 27 fit over stainless steel shafts 28 held in place by plug welds 29.

A suitable sealing unit 32 is mounted on the wall 21 surrounding each shaft and is constructed and arranged to prevent the leakage of any fluid along the shaft through the wall. In the form illustrated in Figs. 1–4 the sealing unit 32 comprises a cup-shaped body 33 fitting into an opening 34 in wall 21 and provided with an end plate 35 extending across said opening, a central bore 36 in plate 35 fitting shaft 28. Cylindrical side wall 37 of body 33 extends through opening 34 and carries a radial mounting flange 38. Body 33 is advantageously formed integrally from suitable corrosion-resistant material such as hard rubber.

In this embodiment a lead mounting ring 40 advantageously extends around opening 34, the ring having its inner face flush with the lead lining 26 and connected thereto by burned joint 40a. Ring 40 fits against the adjacent margins of lining 26 and wall 21 and advantageously overlaps the outer face of the latter to an extent sufficient to prevent displacement of the ring when subjected to inward thrust. The central wall of ring 40 forms the side wall of opening 34 against which the wall 37 of body 33 is fitted, and mounting flange 38 registers with the outer face of ring 40, a soft rubber gasket 41 being advantageously interposed.

A mounting plate 42 of sheet metal, preferably stainless steel (Figs. 3 and 5), bears against the outer face of flange 38, a soft rubber gasket 43 being advantageously located between the plate and the flange. Said plate is provided with a central opening 44 registering with the inner face of the body wall 37, and is suitably attached to wall 21. For this purpose plate 42 is provided with corners projecting beyond the flange 38 (Fig. 5) and carrying holes 45 fitting over threaded studs 46 carried by wall 21 and provided with nuts 47 bearing against plate 42. Studs 46 and nuts 47 are advantageously made of stainless steel.

A suitable sealing ring mounted on and rotating with shaft 28 bears against the outer face of end plate 35 to provide a leak proof joint. In the illustrated embodiment the sealing ring 50 is formed of graphite or other material which will form a tight low friction joint with end plate 35. Sealing ring 50 fits slidably on shaft 28 and advantageously is spaced slightly from the central face of the body wall 37.

A suitable construction is provided for pressing ring 50 against plate 35 and forming a leak proof joint between said ring and shaft 28. In the form shown this is accomplished by forming the outer face of ring 50 with an annular recess 51 extending around shaft 28, fitting the end portion of a cylindrical soft rubber pressure cylinder 52 which fits snugly on said shaft. Recess 51 may be provided with suitable peripheral indentations such as screw threads 53 into which the soft rubber of cylinder 52 is forced when the latter is placed under actual pressure. The outer face of cylinder 52 may be slightly tapered or reduced in diameter adjacent the inner end of the cylinder to facilitate initial introduction into recess 51.

A suitable backing member mounted on shaft 28 and bearing against pressure cylinder 52 is arranged to exert and maintain pressure on the soft rubber cylinder, the pressure being transmitted by the latter to the sealing ring 50 and serving to maintain a tight joint between the sealing ring and end plate 35. This is accomplished in the illustrated arrangement by providing a collar 54 slidable on shaft 28 and which may be forced against the end of pressure ring 52 to compress the latter to the desired extent, the collar being then held in place on shaft 28 by set screws 55 of stainless steel. Collar 54 may be constructed of hard rubber and is advantageously integral with pressure ring 52.

Each shaft 28 is supported in a suitable bearing located outside of the sealing unit 32 and mounted on wall 21. In the illustrated arrangement journal 56 engaging a slightly reduced portion of shaft 28 is mounted by means of bolts 57 passing through spacer bar 58 and outwardly extending flange 59 of bracket 60 fixed to wall 21, said bracket advantageously consisting of an angle-iron in the form illustrated. A sprocket 61 (Fig. 1) is keyed to the outer end of each shaft 28 at one side of compartment 20, arranged so that all conveyor rollers 23 may be driven by a single chain 62 engaging the series of sprockets 61.

The modification shown in Figs. 6 and 7 is similar in construction to that shown in Fig. 3 but omits the lead lining 26 and mounting ring 40, opening 34 being formed directly in the wall 21. In this arrangement gasket 41 bears directly against said wall 21. The outer rubber gasket 43 and mounting plate 42 are dispensed with, studs 46 extending through flange 38, which is rectangular in shape. The body 33 in this embodiment may be constructed of cast iron or of other suitable material. In order to avoid excessive wear between the sealing ring 50 and end plate 35, a suitable annular washer 63 may be interposed. The washer is in leak-proof engagement with body 33, and is advantageously seated in a close-fitted socket 64 formed in the outer face of plate 35.

While the disclosed construction when properly installed and operated is leakproof, there is always a possibility that a leak may develop through accident, misuse or wear; and where especially corrosive liquids are involved, it is desirable to provide protection against leakage in such emergencies. In the disclosed arrangement a leakage trough 65 (Figs. 1 and 2) is located beneath each sealing unit 32, being attached to the outer face of wall 21 and advantageously running along the wall immediately below the series of units 32. In addition, a suitable construction may be provided for guiding into trough 65 any liquid leaking through a unit 32 and preventing it from coming in contact with other parts of the sealing unit construction, particularly studs 46 and nuts 47. The disclosed arrangement includes a pair of downwardly converging flanges 66 (Figs. 1, 2, 3 and 5) on the outer face of mounting plate 42 and advantageously integral therewith, extending around the lower studs 46 and nuts 47 and spaced at their lower ends by a short distance to form in effect a downwardly directed spout located immediately above trough 65.

The sealing unit and bearing construction are readily assembled and mounted. The assembly of the sealing unit 32 has already been indicated. Access to each unit is readily obtained by removing the contiguous bearing construction. Any tendency toward leakage between the body 33 and the margin of opening 34 is checked by gasket 41. Any tendency toward leakage along shaft 28 through bore 36 is checked by the tightly fitting sliding joint between sealing ring 50 and end plate 35; and no liquid can leak between the shaft 28 and ring 50 under normal conditions, since the soft rubber pressure ring 52 is forced into tight fitting engagement with shaft 28 and the walls of recess 51 in ring 50. This construction provides a tight seal by means of a joint maintained under substantial pressure but without producing objectionable friction, due to the use of antifriction surfaces. Any liquid which might leak along shaft 28 and between ring 50 and plate 35 through wear, improper adjustment or damage to the parts will be guided along the inner face of side wall 37 and between flanges 66 to trough 65. The pressure on the joint can be varied, and leakage along the shaft may be stopped, by adjusting collar 54. It will be noted likewise that the construction provides a yieldable thrust bearing for the roller 23 at each end.

Opening 34 is advantageously larger in diameter than roller 23, permitting endwise removal of each roller without disturbing other rollers when the bearings and sealing units of the roller are removed.

While certain parts have been described as suitable for construction from hard rubber, other materials may be substituted, particularly where certain chemical or temperature resistant qualities are desirable, including the various artificial resins and certain types of metal.

While a separate bearing for each shaft 28 has been disclosed and is mechanically desirable in the embodiment illustrated, this showing is not intended to be restrictive, since the end plate 35 may readily be utilized as a bearing under suitable circumstances, and even in the illustrated arrangement serves to support the shaft rotatably when journal 56 is removed.

Moreover, while a separate member 33, fixed to the wall 21 for the purpose of providing a suitable surface engaged by the sealing ring 50, is shown, this showing likewise is not intended to limit the invention, since ring 50 is arranged and adapted to bear equally well against a portion of wall 21 or any structure mounted thereon.

We have described what we believe to be the best embodiments of our invention. We do not wish, however, to be confined to the embodiments shown, but what we desire to cover by Letters Patent is set forth in the appended claims.

We claim:

1. A shaft sealing construction comprising a wall provided with a corrosion-resistant inner surface and having a shaft opening, a mounting ring of corrosion-resisting material sealed in the opening and extending throughout the bore of said opening and continuously joined to both the inner and outer surfaces of the wall, a rubber wall member extending across the opening and provided with a bore rotatably fitting the shaft, means for mounting the wall member on the wall to form a fluid-tight continuous connection with the mounting ring, and sealing means mounted on the shaft including a sealing member having an annular sealing face bearing slidably against the wall member to form a sealing joint and a fluid-tight connection between the sealing member and the shaft.

2. A shaft sealing device adapted to seal an opening in a wall surface extending around the shaft, comprising a sealing member mounted on said shaft for rotation therewith, said sealing member having an annular sealing face bearing slidably against the wall surface to form a sealing joint and an annular recess extending around the shaft, a compression member of resilient material extending around and in fluid-tight engagement with the shaft, said compression member extending into said recess, said recess having circumferential indentations arranged to receive expanded portions of the compression member when under compression, and a compression collar mounted on the shaft engaging said compression member.

3. A shaft sealing construction adapted to seal an opening in a wall plate extending around the shaft, comprising a wall member adapted to be mounted across said opening and extending around the shaft, a sealing member mounted on said shaft for rotation therewith and having an annular sealing face bearing slidably against the the wall member to form a sealing joint, a resilient device bearing against the sealing member arranged to bias said sealing member against the wall member, and liquid guide members extending downwardly and toward each other along the outer face of the wall member below and at opposite sides of the shaft, arranged to guide to a restricted discharge, liquid leaking through the wall member along the shaft.

4. A device for sealing the opening in a wall plate around a shaft comprising a sealing ring of rigid material mounted on the shaft for slidable movement therealong and having an axially facing annular sealing surface slidably bearing against an axially facing annular sealing surface on said wall plate to form a sealing joint, a compression sleeve of resilient material embracing said shaft with a peripheral sealing fit, and bearing axially against said ring, and a collar integral with said compression sleeve, but of harder material, adjustable along said shaft, and adapted to be affixed to said shaft in adjusted position for pressing said sleeve axially toward said wall plate, said compression sleeve being urged radially inwardly into sealing contact with the periphery of said shaft by the axial pressing action of said pressing means against said compression sleeve.

5. A device for sealing the opening in a wall around a shaft comprising a hollow cup-shaped body fitting into said opening and provided with an end plate extending across said opening to the periphery of said shaft, and a peripheral wall extending outwardly beyond said end plate, said body being secured to said wall, a sealing ring of rigid material mounted on the shaft for slidable movement therealong and for rotation therewith, and having an axially facing annular sealing surface slidably bearing against an axially facing annular sealing surface on the outer side of said end plate, said ring being housed in the hollow of said body, and having a snug fit with the periphery of said shaft, a resilient member embracing said shaft, and axially pressing said sealing member against said wall plate, a gutter supported on said wall below said body, and a pair of liquid guide members converging downwardly from the outer end of said body, and adapted to lead leakage liquid from the hollow of said body towards said gutter.

6. A device for sealing the opening in a wall around a shaft, comprising a sealing ring of rigid material mounted on the shaft for slidable movement therealong and having an axially facing annular sealing surface slidably bearing against an axially facing annular sealing surface on said wall to form a sealing joint and an annular recess extending around said shaft, a compression sleeve of resilient material extending into said recess and embracing said shaft with a peripheral sealing fit, said compression sleeve bearing axially against said ring, said sleeve and said sealing ring being interconnected for rotation in unison, a collar adjustable along said shaft and affixed to said shaft in adjusted position for rotation with said shaft, said collar pressing said sleeve axially toward said wall and being positively connected to said sleeve for rotation therewith, said sealing ring and said collar being spaced a substantial axial distance apart, and said compression sleeve between said sealing ring and said collar being free from confining outer peripheral restriction substantially along said distance, said compression sleeve being urged radially inwardly into sealing contact with the periphery of said shaft by the axial pressing action of said collar against said compression sleeve.

7. A shaft sealing device adapted to seal an opening in a wall surface extending around the shaft, comprising a sealing member mounted on said shaft for rotation therewith, said sealing member having an annular sealing face bearing slidably against the wall surface to form a sealing joint and an annular recess extending around the shaft, a compression member of resilient material extending around and in fluid-tight engagement with the shaft, said compression member extending into said recess, means between said sealing member and said compression member positively connecting them for rotation in unison, a compression collar mounted on the shaft engaging said compression member, means connecting said collar to said shaft for rotation therewith, and means positively connecting said collar and said compression member for rotation in unison.

ERICH R. ZADEMACH.
WILLIAM W. CLARKE.